United States Patent
Yamada

(10) Patent No.: US 8,675,235 B2
(45) Date of Patent: Mar. 18, 2014

(54) PRINTING APPARATUS

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 77 days.

(21) Appl. No.: 13/332,928

(22) Filed: Dec. 21, 2011

(65) Prior Publication Data

US 2012/0194857 A1   Aug. 2, 2012

(30) Foreign Application Priority Data

Jan. 31, 2011   (JP) .................................. 2011-017567

(51) Int. Cl.
*G06F 3/12* (2006.01)
*G06K 15/00* (2006.01)

(52) U.S. Cl.
USPC ................... 358/1.15; 358/1.13; 358/1.14

(58) Field of Classification Search
USPC .................................. 358/1.1–1.9, 1.11–1.18
See application file for complete search history.

(56) References Cited

U.S. PATENT DOCUMENTS

| | | | | |
|---|---|---|---|---|
| 6,559,961 B1 * | 5/2003 | Isernia et al. | ................ | 358/1.14 |
| 2008/0018924 A1 * | 1/2008 | White et al. | ................ | 358/1.13 |
| 2011/0026067 A1 * | 2/2011 | Hamaguchi | ................ | 358/1.14 |

FOREIGN PATENT DOCUMENTS

| | | |
|---|---|---|
| JP | 08-225241 | 9/1996 |
| JP | 2003-259064 | 9/2003 |
| JP | 2003-337450 | 11/2003 |
| JP | 2004-045892 | 2/2004 |
| JP | 2006-163913 | 6/2006 |
| JP | 2006-297654 A | 11/2006 |
| JP | 2007-098846 | 4/2007 |

OTHER PUBLICATIONS

JP Office Action dtd Jan. 22, 2013, JP Appln. 2011-017567, partial English translation.

* cited by examiner

*Primary Examiner* — King Poon
*Assistant Examiner* — Ibrahim Siddo
(74) *Attorney, Agent, or Firm* — Banner & Witcoff, Ltd.

(57) ABSTRACT

A printing apparatus includes a storage section which stores printing jobs to be printed on a recording paper sheet; a transport section which transports the recording paper sheet; a printing section which performs the printing on the recording paper sheet transported by the transport section based on one of the printing jobs stored in the storage section; an occurrence rate judging section which calculates an occurrence rate of a jam of the recording paper sheet in the transport section during the printing based on each of the printing jobs stored in the storage section, and which compares a first occurrence rate which is the occurrence rate of a first printing job stored first in the storage section with a second occurrence rate which is the occurrence rate of a second printing job stored second in the storage section; and a control section which controls the printing section.

12 Claims, 9 Drawing Sheets

| TYPES OF RECORDING PAPER SHEETS | THE NUMBER OF TIMES OF JAM | THE NUMBER OF PAPERS PRINTED | OCCURRENCE RATE OF JAM |
|---|---|---|---|
| REGULAR PAPER SHEET | 1 | 500 | 0.2% |
| THICK PAPER SHEET | 4 | 30 | 13% |
| ENVELOPE | 0 | 5 | 0% |
| RECYCLED PAPER SHEET | 0 | 120 | 0% |
| THIN PAPER SHEET | 0 | 10 | 0% |
| LABEL PAPER SHEET | 0 | 8 | 0% |
| GLOSS PAPER SHEET | 3 | 15 | 20% |

| TRAYS T | THE NUMBER OF TIMES OF JAM | THE NUMBER OF PAPERS PRINTED | OCCURRENCE RATE OF JAM |
|---|---|---|---|
| STANDARD TRAY | 2 | 458 | 0.4% |
| OPTIONAL TRAY | 5 | 50 | 10% |

| PRINTING MODE | THE NUMBER OF TIMES OF JAM | THE NUMBER OF PAPERS PRINTED | OCCURRENCE RATE OF JAM |
|---|---|---|---|
| SINGLE-SIDED PRINTING | 1 | 550 | 0.2% |
| DOUBLE-SIDED PRINTING | 7 | 69 | 5.1% |

PRINTING APPARATUS

CROSS-REFERENCE TO RELATED APPLICATION

The present application claims priority from Japanese Patent Application No. 2011-017567, filed on Jan. 31, 2011, the disclosure of which is incorporated herein by reference in its entirety.

BACKGROUND OF THE INVENTION

1. Field of the Invention

The present invention relates to a printing apparatus provided with a detecting function for a jam of a recording paper sheet.

2. Description of the Related Art

There has conventionally been known a printing apparatus as described in Japanese Patent Application Laid-open No. 2003-259064. In the printing apparatus, when a jam of a recording paper sheet occurs in a transport route during a copy operation in which an image is printed onto the recording paper sheet based on image data read from a document, only the operation in the transport route is stopped. However, scanning of the document is continued, and the image data read from the document is stored in a RAM. In the printing apparatus, when the jam of the recording paper sheet is cleared, the image data on a page in which printed-output (printout) is discontinued due to the jam of the recording paper sheet is read from the RAM. Then, the printout operation is resumed based on the image data read from the RAM.

However, even if the jam of the recording paper sheet is cleared by a user, the jam of the recording paper sheet occurs again and again in the transport route in some cases. In such a case, even if the jam of the recording paper sheet is cleared by the user, unless any of printing conditions such as a type of the recording paper sheet, a paper tray to be used, a printing mode to be executed (i.e. a single-sided printing or a double-sided printing), etc., is changed, the jam of the recording paper sheet is more likely to recur in the transport route. For example, in a case that the jam of the recording paper sheet often occurs during printing on a thick paper sheet, even if the jam of the recording paper sheet is cleared, the jam of the recording paper sheet is more likely to recur, unless, for example, the type of the recording paper sheet is changed from the thick paper sheet to a regular paper sheet. Accordingly, a problem arises such that, the jam of the recording paper sheet occurs in the printing based on a printing job having a high occurrence rate of the jam of the recording paper sheet, and the printing based on a printing job having a low occurrence rate of the jam of the recording paper sheet is made to wait.

SUMMARY OF THE INVENTION

The present invention has been made in order to solve the problem as described above, an object of which is to provide a printing apparatus in which printing based on a printing job having a low occurrence rate of a jam of a recording paper sheet is less likely to wait due to the printing based on a printing job having a high occurrence rate of the jam of the recording paper sheet.

According to a first aspect of the present teaching, there is provided a printing apparatus which performs printing on a recording paper sheet, including: a storage section which stores a plurality of printing jobs to be printed on the recording paper sheet; a transport section which transports the recording paper sheet; a printing section which performs the printing on the recording paper sheet transported by the transport section based on one of the printing jobs stored in the storage section; an occurrence rate judging section which calculates an occurrence rate of a jam of the recording paper sheet in the transport section during the printing based on each of the printing jobs stored in the storage section, and which compares a first occurrence rate which is the occurrence rate during the printing based on a first printing job stored first in the storage section with a second occurrence rate which is the occurrence rate during the printing based on a second printing job stored second in the storage section; and a control section which controls the printing section so that the printing based on the second printing job is performed before the printing based on the first printing job is performed, in a case that the occurrence rate judging section judges that the second occurrence rate is smaller than the first occurrence rate. Here, the occurrence rate which is the occurrence rate of the jam of the recording paper sheet may be either an occurrence rate of the jam per one recording paper sheet or an occurrence rate of the jam for each of the printing jobs.

According to this structure, in a case that the occurrence rate of the jam of the recording paper sheet in the printing based on the first printing job is higher than the occurrence rate of the jam of the recording paper sheet in the printing based on the second printing job, the printing based on the second printing job is performed before the printing based on the first printing job is performed. Accordingly, it is possible to suppress occurrence of the jam of the recording paper sheet in the printing based on the first printing job having a higher occurrence rate of the jam of the recording paper sheet. Further, the printing based on the second printing job having a lower occurrence rate of the jam of the recording paper sheet is less likely to wait due to the printing based on the first printing job having the higher occurrence rate of the jam of the recording paper sheet.

According to a second aspect of the present teaching, there is provided a printing apparatus which performs printing on a recording paper sheet, including: a transport section which transports the recording paper sheet; a printing section which performs the printing on the recording paper sheet transported by the transport section based on a printing job having a plurality of printing conditions; an occurrence rate judging section which judges, based on the printing conditions of the printing job, whether an occurrence rate of a jam of the recording paper sheet in the transport section during the printing for the printing job exceeds a predetermined value; and a control section which controls the transport section and the printing section, wherein in a case that the occurrence rate judging section judges that the occurrence rate of the printing job exceeds the predetermined value, the control section controls the transport section and the printing section so that the printing based on the printing job is not performed unless a setting of at least one of the printing conditions of the printing job is changed.

According to this structure, the printing job, which has the occurrence rate of the jam of the recording paper sheet exceeding the predetermined value, is not executed unless the setting of any one of the printing conditions is changed. Therefore, it is possible to suppress the occurrence of the jam of the recording paper sheet.

BRIEF DESCRIPTION OF THE DRAWINGS

FIG. 3 is a diagram showing an example of a jam information table for each type of recording paper sheets.

FIG. 4 is a diagram showing an example of a jam information table for each type of trays.

FIG. 5 is a diagram showing an example of a jam information table for each type of printing modes.

DESCRIPTION OF THE PREFERRED EMBODIMENTS

First Embodiment

Figure 1:
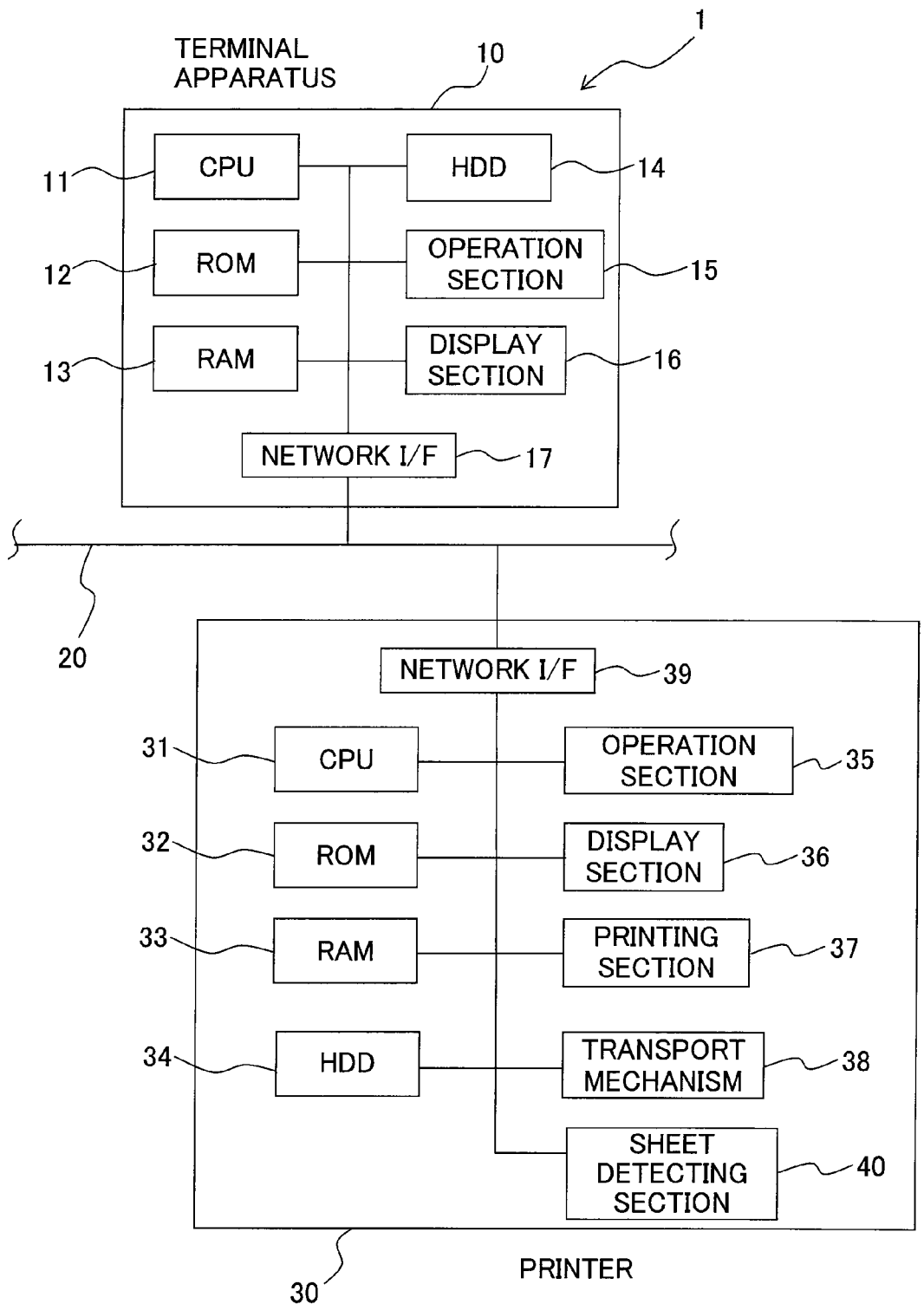
FIG. 1 is a block diagram showing an electrical structure of a printing system according to an embodiment of the present teaching.

An explanation will be made about an electrical structure of a printing system 1 of this embodiment with reference to FIG. 1. The printing system 1 includes a terminal apparatus 10 (e.g. a personal computer, an example of an information-processing apparatus, etc.) and a printer 30 (an example of a printing apparatus).

The terminal apparatus 10 is provided with a CPU 11, a ROM 12, a RAM 13, a hard disk drive (HDD) 14, an operation section 15 including a keyboard, a pointing device, etc., a display section 16 including a liquid crystal display (an example of a display section) etc., a network interface (network I/F) 17 connected to a communication line 20, and the like. Various programs, such as OS (operating system), application software which is capable of creating data for printing, and a printer driver for controlling the printer 30, are stored in the hard disk drive 14.

The printer 30 is provided with a CPU 31 (an example of an occurrence rate judging section, a control section, a job judging section, and a changing section), a ROM 32, a RAM 33, a hard disk drive (HDD) 34, an operation section 35, a display section 36 (an example of a display section), a printing section 37 (an example of a printing section), a transport mechanism 38 (an example of a transport section), a network interface (network I/F) 39, sheet detecting section 40, etc. Various programs for controlling an operation of the printer 30 are stored in the ROM 32. The CPU 31 controls the operation of the printer 30 while storing, in the RAM 33, a processing result in accordance with the program read from the ROM 32.

A printing queue etc. is stored in the RAM 33. A jam information table etc., as will be described later, is stored in the hard disk drive 34.

The operation section 35 is provided with a plurality of buttons through which a user is capable of performing various input operations such as an instruction to start the printing.

The display section 36 includes the liquid crystal display, a lamp, and the like. The display section 36 is capable of displaying various setting screens, operation states, etc. The printing section 37 performs the printing onto a recording paper sheet W. The network interface 39 is connected to the external terminal apparatus 10 etc. via the communication line 20, and thereby making it possible to perform a data communication between the terminal apparatus 10 and the printer 30. The transport mechanism 38 and the sheet detecting section 40 will be described later.

Figure 2:
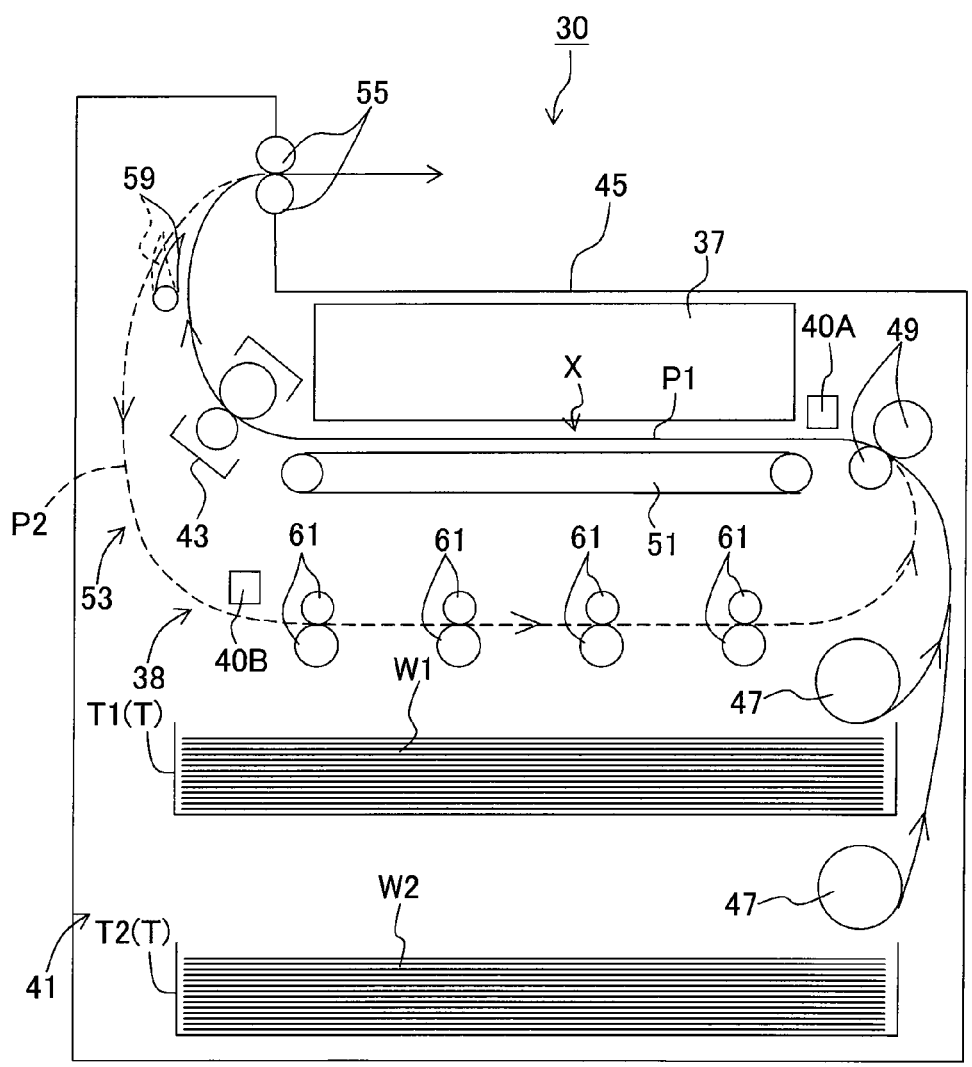
FIG. 2 schematically shows an internal structure of a printer.

Next, an internal structure of the printer 30 will be explained with reference to FIG. 2.

The printer 30 includes an accommodating section 41, the transport mechanism 38, the printing section 37, a fixing unit 43, a paper discharge tray 45, etc.

The accommodating section 41 is provided on the bottom portion of the printer 30. The accommodating section 41 includes a plurality of trays T which are, for example, a standard tray T1 and an optional tray T2. The recording paper sheets W are accommodated in the respective trays T.

The transport mechanism 38 includes pickup rollers 47, resist rollers 49, a transport belt 51, a reversing mechanism 53, etc. Each of the pickup rollers 47 takes the recording paper sheets W accommodated in one of the trays T one-by-one and transports each recording paper sheet to the resist rollers 49. The resist rollers 49 adjust a posture of the recording paper sheet W transported to send the recording paper sheet W onto the transport belt 51 at a predetermined timing.

The printing section 37 prints the image, based on the image data, onto the recording paper sheet W in a well-known electro-photographic manner (charge—exposure—development—transfer-fixing). For example, a monochrome (black and white) image or a color image based on, for example, the printing data received from the terminal apparatus 10 is formed on the recording paper sheet W transported by the transport belt 51 at a predetermined printing position X. The image formed on the recording paper sheet W is thermally fixed by the fixing unit 43, and then the recording paper sheet W is discharged on the paper discharge tray 45. A route (solid arrow portions in FIG. 2) for guiding the recording paper sheet W from each of the trays T to the printing portion X is referred to as a print transport path P1.

The reversing mechanism 53 includes paper discharging rollers 55, a reversing transport path P2 (dotted-line arrow portions in FIG. 2), a flapper 59, a plurality of reversing transport rollers 61, etc. For example, in a case that a double-sided printing is performed in a system in which the printing is consecutively performed on both sides of one recording paper sheet, the image is printed on the back surface of the recording paper sheet W (corresponding to the lower surface of the recording paper sheet W in the tray T) by the printing section 37, then, the recording paper sheet W is once transported to the paper discharging rollers 55. When the paper discharging rollers 55 are reversely rotated, the recording paper sheet W is transported via the flapper 59, the reversing transport path P2, the plurality of reversing transport rollers 61, and the resist rollers 49, and is fed on the transport belt 51 in a state that the front surface and the back surface of the recording paper sheet W are turned over. After the image is printed on the front surface of the recording paper sheet W (corresponding to the upper surface of the recording paper sheet W in the tray T) by the printing section 37, the recording paper sheet W is discharged on the paper discharge tray 45.

The sheet detecting section 40 include a plurality of sensors 40A, 40B. Each of the sensors 40A, 40B outputs a detecting signal depending on an absense or a presence of the recording paper sheet W at each of the transport positions in the transport mechanism 38. When the CPU 31 continuously receives the detecting signal indicating the presence of the recording paper sheet W from each of the sensors 40A, 40B for a specified time or longer, or when the CPU 31 does not receive the detecting signal from each of the sensors 40A, 40B even after the specified time has passed, the CPU 31 judges that a jam (a jam of the recording paper sheet) occurs at each of the transport positions. In the first embodiment, as shown in FIG. 2, the sensor 40A is provided in the print transport path P1 and the sensor 40B is provided in the reversing transport path P2. Thus, the CPU 31 is capable of judging at which one of the print transport path P1 and the reversing transport path P2 the jam occurs.

FIG. 3 is a jam information table in which the number of times of jams, the number of recording paper sheets printed, and a jam occurrence rate per one recording paper sheet, for each type of recording paper sheets are stored. FIG. 4 is a jam information table in which the number of times of jams, the number of recording paper sheets printed, and the jam occurrence rate per one recording paper sheet, for each type of trays are stored. FIG. 5 is a jam information table in which the number of times of jams, the number of recording paper sheets printed, and the jam occurrence rate per one recording paper sheet, for each type of printing modes are stored. In each of the jam information tables, the number of times of jams, the number of recording paper sheets printed, and the jam occurrence rate are renewed every time when the printing is performed. Each jam occurrence rate per one recording paper sheet shown in FIG. 3 to FIG. 5 is determined by, for example, history of usage of the printer 30 for the last one month. The jam occurrence rate for the thick paper sheet etc. is high due to aged deterioration of the pickup rollers 47, the resist rollers 49, etc. Further, the values shown in the jam information tables of FIG. 3 to FIG. 5 are merely examples of this embodiment, and thus the printer 30 does not have these values when shipped from a factory.

FIG. 3 is a diagram showing an example of a jam information table 200 of each type of the recording paper sheets, in which the number of times of jams, the number of recording paper sheets printed, and the jam occurrence rate per one recording paper sheet, for each type of recording paper sheets are stored. For example, the jam occurrence rate differs depending on the thickness of each recording paper sheet.

FIG. 4 is a diagram showing an example of a jam information table 210 of each type of the trays T, in which the number of times of jams, the number of recording paper sheets printed, and the jam occurrence rate per one recording paper sheet, for each type of the trays T are stored. For example, the jam occurrence rate differs depending on the length of each transport route (i.e. the length of the transport route from the pickup roller 47 of the tray T1 to the resist rollers 49 is different from that of the transport route from the pickup roller 47 of the tray T2 to the resist rollers 49) or frequency in use of each component of the printer 30.

FIG. 5 is a diagram showing an example of a jam information table 220 of each type of the printing modes, in which the number of times of jams, the number of recording paper sheets printed, and the jam occurrence rate per one recording paper sheet, for each type of the printing modes are stored. For example, the jam occurrence rate differs depending on the length of each transport route (i.e. the length of the transport route used in the single-sided printing is different from that of the transport route used in the double-sided printing). The single-sided printing uses only the print transport path P1. On the other hand, the double-sided printing uses not only the print transport path P1 but also the reversing transport path P2. Therefore, the length of the transport route used in the single-sided printing is different from that of the transport route used in the double-sided printing.

Each jam occurrence rate per one recording paper sheet is the occurrence rate of the jam occurred in the printer 30 for one of each type of the recording paper sheets, each type of the trays T, and each type of the printing modes. In this embodiment, the jam occurrence rate is calculated by dividing the number of times of occurrence of each of the jams by a cumulative number of recording paper sheets W printed by the printer 30. When the double-sided printing is preformed, the recording paper sheet W is not counted as two sheets, but counted as one sheet. Here, for example, it is assumed that the printing is performed on one type of the recording paper sheet W. In a case that the printing is performed by the printer 30 for the first time and that the jam occurs during the printing on the first recording sheet W, the jam occurrence rate is calculated as 100%. In a case that the printing is successfully performed on the second recording paper sheet W, the jam occurrence rate is calculated as 50%. As such, in a case that the cumulative number of recording paper sheets printed is small, if the jam occurrence rate is calculated by dividing the number of times of occurrence of the jam of the one type of the recording paper sheet W by the cumulative number of the one type of the recording paper sheets W printed, variation of the jam occurrence rate for one printing is more likely to be extremely large. In view of this, in this embodiment, for example, in a case that the cumulative number of the one type of the recording paper sheets W printed is less than a predetermined number of paper sheets (for example ten sheets), the jam occurrence rate of the one type of the recording paper sheet W is regarded as 0%. After the cumulative number of the one type of the recording paper sheets W printed is not less than the predetermined number of paper sheets (for example ten sheets), the jam occurrence rate of the one type of the recording paper sheet W is calculated by dividing the number of times of occurrence of the jam of the one type of the recording paper sheet W by the cumulative number of the one type of the recording paper sheets W printed. Accordingly, the large variation in the jam occurrence rate for one printing is avoided in the recording paper sheet W having the small cumulative number of the recording paper sheets W printed.

Figure 6A:
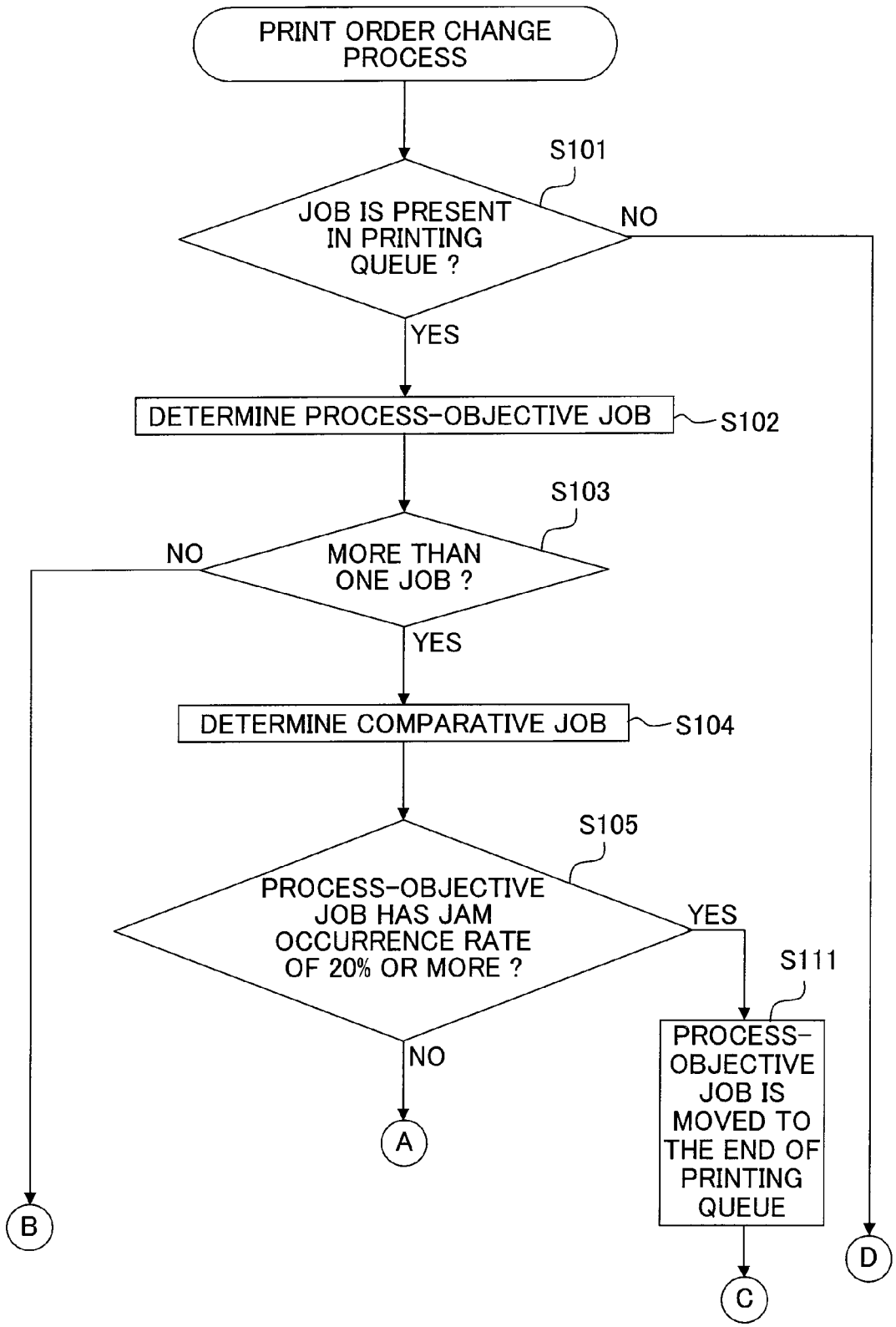
FIGS. 6A and 6B are a flowchart showing a print order change process according to the first embodiment of the present teaching.
Figure 6B:
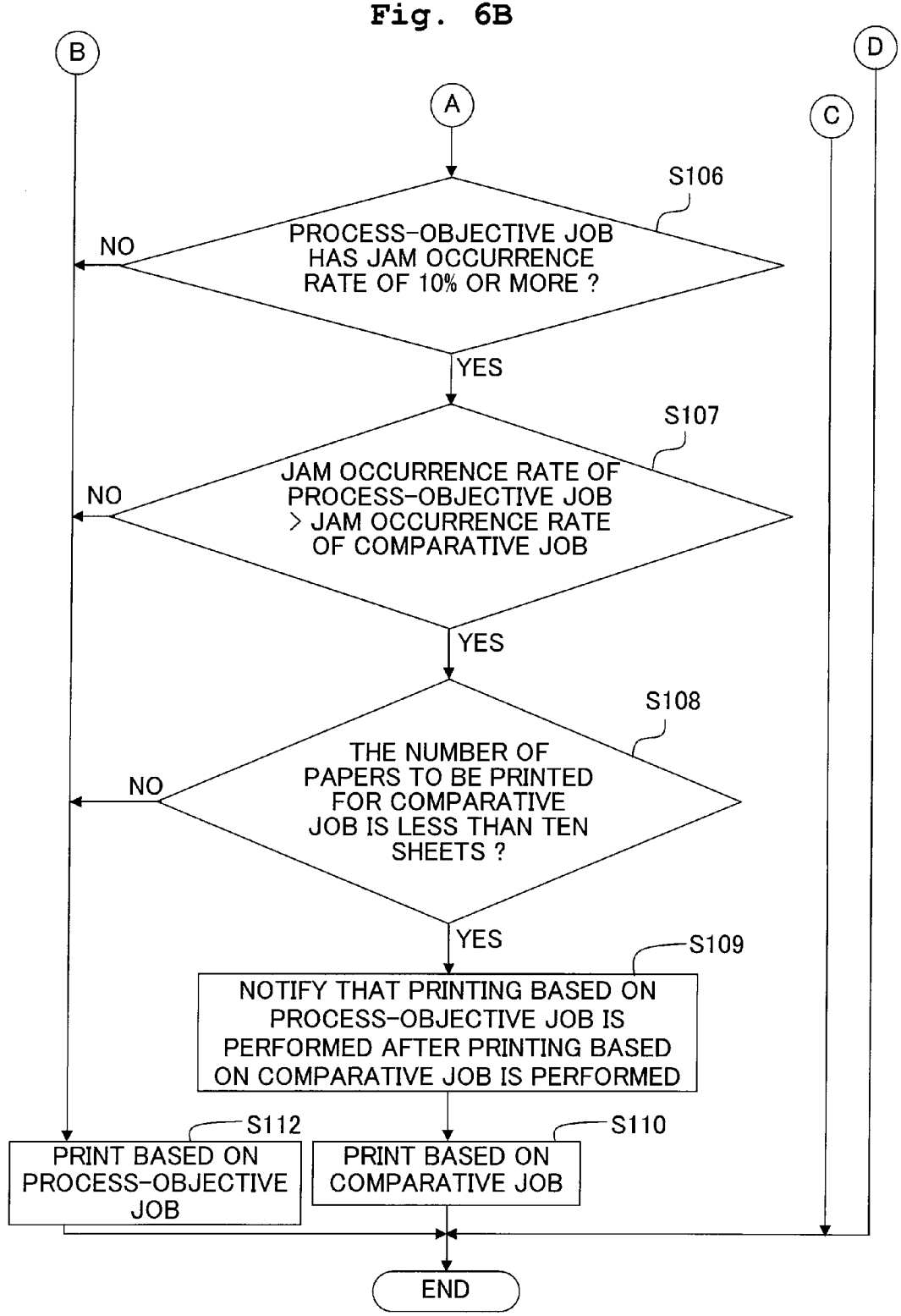

An explanation will be made about a print order change process for changing a print order of a printing job having a high occurrence rate of the jam with reference to a flowchart of FIGS. 6A and 6B. When the printing instruction is carried out by the user via the operation section 35 of the printer 30, the CPU 31 stores the printing job in the printing queue of the RAM 33 in a descending order starting from the printing job instructed first by the user. The CPU 31 stores the printing job in the same manner also when the printing instruction is carried out by the user via the operation section 15 of the terminal apparatus 10. Further, the CPU 31 periodically executes the print order change process, independently of the printing instruction.

At first, the CPU 31 judges whether the printing job is present in the printing queue stored in the RAM 33 (S101). When the printing job is not present in the printing queue (S101: NO), the print order change process is completed.

On the other hand, when the CPU 31 judges that the printing job is present in the printing queue (S101: YES), the printing job, which is the first printing job in the printing queue, is determined as a process-objective job which is to be processed (S102), and it is judged whether there is more than one printing job in the printing queue (S103).

In S103, when the CPU 31 judges that the printing job in the printing queue is one (S103: NO), the process-objective job is printed by the printing section 37 (S112). Then, the print order change process is completed. The reason thereof is considered as follows. That is, even if the jam for the process-objective job occurs, since there is no other job in the printing queue, any trouble for a person other than the user performing the instruction of the process-objective job is hardly caused.

On the other hand, when the CPU 31 judges that there is more than one printing job in the printing queue (S103: YES), the second printing job which follows the first printing job in the printing queue (the printing job which follows the process-objective job) is determined as a comparative job which is to be compared with the process-objective job (S104).

Next, the CPU 31 judges whether the jam occurrence rate per one recording paper sheet in the printing condition of the process-objective job (first occurrence rate) is 20% or more (S105). When the jam occurrence rate per one recording paper sheet in the printing condition of the process-objective job is less than 20% (S105: NO), the CPU 31 subsequently judges whether the jam occurrence rate per one recording paper sheet in the printing condition of the process-objective job is 10% or more (S106). When the CPU 31 judges that the jam occurrence rate per one recording paper sheet in the printing condition of the process-objective job is 10% or more (S106: YES), it is judged which one of the jam occurrence rate per one recording paper sheet in the printing condition of the process-objective job and the jam occurrence rate per one recording paper sheet in the printing condition of the comparative job (second occurrence rate) is higher (S107).

For example, in the jam information table 200 for each type of the recording paper sheets shown in FIG. 3, the jam occurs four times per 30 thick paper sheets, and thus the jam occurrence rate per one thick paper sheet is 13%. Thus, when the printing condition of the process-objective job is the thick paper sheet, the process-objective job is judged, by the CPU 31, as the printing job having the high occurrence rate of the jam and is compared with the comparative job.

On the other hand, in 5105, when the CPU 31 judges that the jam occurrence rate per one recording paper sheet in the printing condition of the process-objective job is 20% or more (S105: YES), the process-objective job is moved to the end of the printing queue (S111). Then, the print order change process is completed. For example, in the jam information table 200 for each type of the recording paper sheets shown in FIG. 3, the jam occurs three times per 15 gloss paper sheets, and thus the jam occurrence rate per one gloss paper sheet is 20%. Therefore, when the printing condition of the process-objective job is the gloss paper sheet, the print order is changed so that the process-objective job is made to be the last printing job in the printing queue.

Here, the jam occurrence rate is judged in S105 and S106 as follows. That is, at first, the CPU 31 extracts the highest occurrence rate of the jam, among the jam information table 200 for each type of the recording paper sheets, the jam information table 210 for each type of the trays T, and the jam information table 220 for each type of the printing modes, based on information about the printing conditions including the type of the recording paper sheet to be used, the tray T to be used, the printing mode to be executed, of the process-objective job and the comparative job. Next, the CPU 31 judges whether or not the jam occurrence rate extracted exceeds a predetermined jam occurrence rate. That is, absolute comparison is performed.

In S107, when the CPU 31 judges that the jam occurrence rate per one recording paper sheet in the printing condition of the process-objective job is higher than the jam occurrence rate per one recording paper sheet in the printing condition of the comparative job (S107: YES), the CPU 31 subsequently judges whether the number of recording paper sheets to be printed for the comparative job is less than 10 sheets (S108). By making relative comparison for the process-objective job and the comparative job as in S107 and S108, it is possible to reliably perform the printing based on the printing job having a lower occurrence rate of the jam per one recording paper sheet before the printing based on the printing job having a higher occurrence rate of the jam per one recording paper sheet is performed.

For example, when the number of recording paper sheets to be printed for the process-objective job is 10 sheets and when the number of recording paper sheets to be printed for the comparative job is 5 sheets, that is, when the number of recording paper sheets to be printed for the comparative job is smaller than the number of recording paper sheets to be printed for the process-objective job, printing time for the comparative job is shorter than that for the process-objective job. On the other hand, when the number of recording paper sheets to be printed for the comparative job is 500 sheets, that is, when the number of recording paper sheets to be printed for the comparative job is larger than the number of recording paper sheets to be printed for the process-objective job, even if the jam occurrence rate of the comparative job is lower than that of the process-objective job, the printing time for the comparative job is longer than that for the process-objective job. Thus, when the printing based on the comparative job is performed before the printing based on the process-objective job is performed, the user which carried out the printing instruction first (the user of the process-objective job) is made to have a long wait in some cases, and thereby causing any inconvenience to the user of the process-objective job. In view of this, only when the CPU 31 judges that the number of recording paper sheets to be printed for the comparative job is less than 10 sheets (S108: YES), the CPU 31 notifies the user of the process-objective job that the process-objective job is executed after the comparative job is executed (S109).

Figure 7:
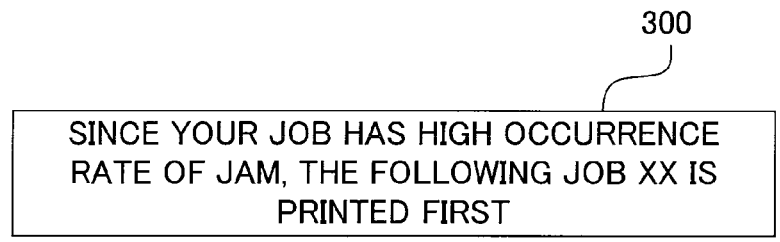
FIG. 7 is a diagram showing an example of a message displayed on a display section.

In particular, for example as shown in FIG. 7, the CPU 31 sends data to the terminal apparatus 10 used by the user of the process-objective job to display a message 300 "Since your job has high occurrence rate of jam, the following job XX is printed first" on the display section 16 of the terminal apparatus 10. Then, the message 300 is displayed on the display section 16 by the CPU 31. Further, it is also assumed that the user of the process-objective job is not near the terminal apparatus 10 used by the user of the process-objective job but near the printer 30. Thus, the message 300 is displayed similarly on the display section 36 by the CPU 31.

Next, the CPU 31 controls the printing section 37 to perform the printing based on the comparative job (S110). Then, the print order change process is completed.

When the CPU 31 judges that the jam occurrence rate per one recording paper sheet in the printing condition of the process-objective job is less than 10% (S106: NO), when the CPU 31 judges that the jam occurrence rate per one recording paper sheet in the printing condition of the comparative job is higher than the jam occurrence rate per one recording paper sheet in the printing condition of the process-objective job (S107: NO), or when the CPU 31 judges that the number of recording paper sheets to be printed for the comparative job is 10 sheets or more (S108: NO), the jam occurrence rate for the process-objective job is low. Accordingly, the printing is carried out by the printing section 37 based on the process-objective job (S112). Then, the print order change process is completed.

Further, when there are three or more printing jobs in the printing queue stored in the RAM 33, and when the jam occurrence rate per one recording paper sheet for the process-objective job is lower than the jam occurrence rate per one recording paper sheet for the comparative job, the CPU 31 controls the printing section 37 to perform the printing based on the process-objective job. Then, when the CPU 31 executes the print order change process for the second time, the comparative job in the print order change process executed for the first time is determined as the process-objective job (S102), and the printing job, which follows the comparative job in the print order change process executed for the first time, is determined as the comparative job (S104).

On the other hand, when the jam occurrence rate per one recording paper sheet for the comparative job is lower than the jam occurrence rate per one recording paper sheet for the process-objective job, the CPU 31 controls the printing section 37 to perform the printing based on the comparative job. Then, when the CPU 31 executes the print order change process for the second time, the process-objective job is not changed and the printing job, which follows the comparative job in the print order change process executed for the first time, is determined as the comparative job (S104).

Effect of First Embodiment

When the CPU 31 judges that the jam occurrence rate per one recording paper sheet in the printing condition of the process-objective job is 10% or more (S106: YES), the CPU 31 permits that the process-objective job is executed after the comparative job is executed (S109 and S110), or the CPU 31 moves the process-objective job to the end of the printing queue (S111). Accordingly, the occurrence of the jam caused by the process-objective job having the high occurrence rate of the jam is suppressed, and thus the situation, in which the printing based on the printing job, which is judged not to have the high occurrence rate of the jam of the recording paper sheet W, is made to wait due to the printing job which is judged to have the high occurrence rate of the jam of the recording paper sheet W, is less likely to be caused.

Further, when the CPU 31 judges that the printing job in the printing queue is one (S103: NO), the process-objective job is printed by the printing section 37 (S112). Accordingly, the printing based on the process-objective job which is likely to have the high occurrence rate of the jam is not unnecessarily suppressed, and it is possible to avoid the situation such that the printing based on the process-objective job having the high occurrence rate of the jam is not performed.

Further, when the CPU 31 judges that the jam occurrence rate per one recording paper sheet in the printing condition of the comparative job is higher than the jam occurrence rate per one recording paper sheet in the printing condition of the process-objective job (S107: NO), or when the CPU 31 judges that the number of recording paper sheets to be printed for the comparative job is 10 sheets or more (S108: NO), the printing based on the process-objective job is performed before the printing based on the comparative job is performed, and it is possible to avoid the situation such that the printing based on the process-objective job is never performed.

Further, even if the jam occurrence rate for the comparative job is lower than the jam occurrence rate for the process-objective job, when the number of recording paper sheets to be printed for the comparative job is large, the user who carried out the printing instruction first (the user of the process-objective job) is less likely to have the long wait. A passing condition which is a condition in which the printing based on the comparative job is performed before the printing based on the process-objective job is performed may include a condition that the number of recording paper sheets to be printed for the comparative job is less than a predetermined number of paper sheets or a condition that the number of recording paper sheets to be printed for the comparative job is less than that for the process-objective job. Further, in addition to the above passing condition that the number of recording paper sheets to be printed for the comparative job is within the predetermined number of paper sheets, the passing condition may include conditions that more than a predetermined time has passed since the comparative job is inputted, that the comparative job is a printing job instructed by a predetermined user, or the like.

Further, the CPU 31 displays the message 300 "Since your job has high occurrence rate of jam, the following job XX is printed first" on the display section 16 of the terminal apparatus 10 used by the user of the process-objective job. Further, the CPU 31 displays the message 300 similarly on the display section 36, thereby making it easy for the user to grasp that the printing based on the process-objective job is not started, and thereby improving user-friendliness.

Further, when the CPU 31 judges that the jam occurrence rate per one recording paper sheet in the printing condition of the process-objective job is 20% or more (S105: YES), the process-objective job is moved to the end of the printing queue (S111). Thus, the printing based on the process-objective job, which has the jam occurrence rate per one recording paper sheet of 20% or more, is executed last of the printing jobs in the printing queue. Therefore, it is possible to avoid the situation such that the jam is caused by the printing based on the process-objective job having the jam occurrence rate per one recording paper sheet of 20% or more and the printing by any other user is made to wait until the jam is cleared. Here, the first value is 20%, and this value has high possibility that the jam occurs during the printing based on one printing job.

When the CPU 31 judges that the jam occurrence rate per one recording paper sheet in the printing condition of the process-objective job is less than 10% (S106: NO), the printing is carried out by the printing section 37 based on the process-objective job (S112). Thus, the user of the process-objective job having the jam occurrence rate per one recording paper sheet of less than 10% is less likely to wait unnecessarily, and the user-friendliness is improved. Here, the second value is 10%.

Second Embodiment

Next, the second embodiment of the present teaching will be explained. The second embodiment is an embodiment which is different from the first embodiment in that when the jam occurrence rate of the printing job is high, the printing job having the high occurrence rate of the jam is canceled.

Figure 8:
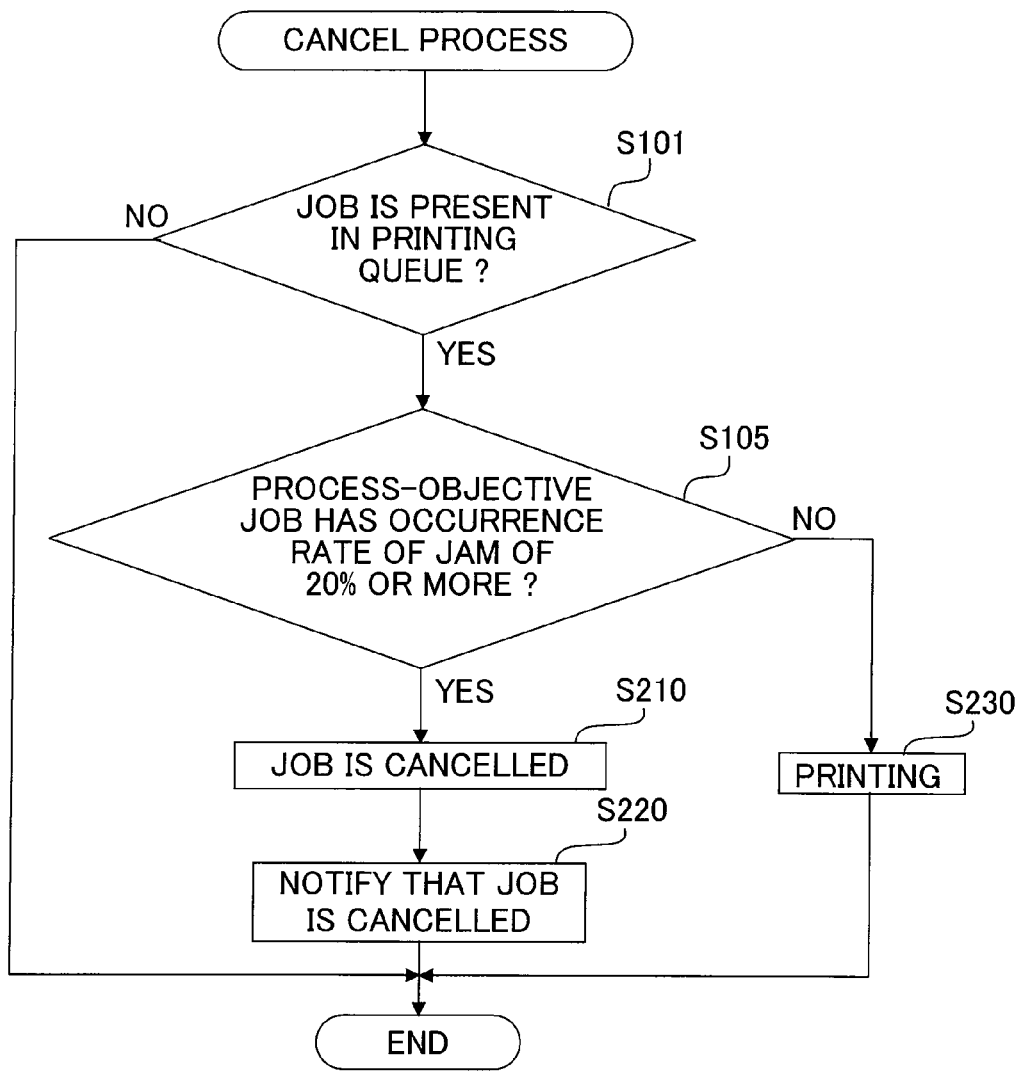
FIG. 8 is a flowchart showing a cancel process according to the second embodiment of the present teaching.

An explanation will be made about a cancel process in which a print setting of the printing job having the high occurrence rate of the jam is cancelled with reference to the flowchart of FIG. 8.

At first, the CPU 31 judges whether the printing job is present in the printing queue stored in the RAM 33 (S101). When the CPU 31 judges that the printing job is present in the printing queue (S101: YES), it is subsequently judged whether the jam occurrence rate per one recording paper sheet in the printing condition of the process-objective job is 20% or more (S105).

Figure 9:
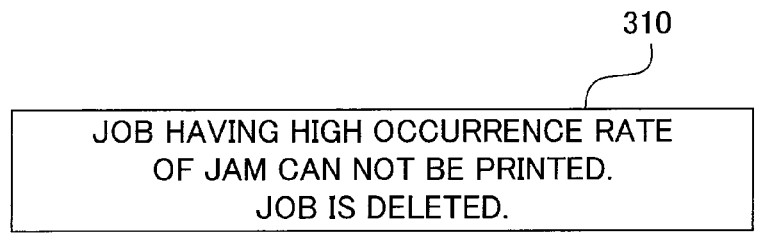
FIG. 9 is a diagram showing an example of another message displayed on the display section.

In S105, when the CPU 31 judges that the jam occurrence rate per one recording paper sheet in the printing condition of the process-objective job is 20% or more (S105: YES), the process-objective job is deleted from the printing queue and the process-objective job is cancelled (S210). Then, the CPU 31 notifies the user via the display section 36 that the process-objective job is cancelled (S220). Then, the cancel process is completed. For example, as shown in FIG. 9, the CPU 31 displays, on the display section 36, a message 310 having the content that "Job having high occurrence rate of jam can not be printed. Job is deleted".

On the other hand, when the CPU 31 judges that the jam occurrence rate per one recording paper sheet in the printing condition of the process-objective job is less than 20% (S105: NO), the printing is performed by the printing section 37 based on the process-objective job (S230). Then, the cancel process is completed.

In S101, when the CPU 31 judges that the printing job is not present in the printing queue (S101: NO), the cancel process is completed.

Effect of Second Embodiment

The CPU 31 deletes the process-objective job, which is judged to have a particularly high occurrence rate of the jam, from the printing queue, and cancels the process-objective job (S210). Thus, the printing based on the process-objective job having the high occurrence rate of the jam is prohibited, and thus the situation, in which the printing based on the printing job which is judged not to have the high occurrence rate of the jam of the recording paper sheet W is made to wait due to the printing job which is judged to have the high occurrence rate of the jam of the recording paper sheet W, is less likely to be caused.

Further, the CPU 31 notifies the user via the display section 36 that the process-objective job is cancelled (S220), thereby making it easy for the user to grasp that the printing job based on the process-objective job is not printed and thereby improving user-friendliness.

Third Embodiment

Next, a third embodiment of the present teaching will be explained. The third embodiment is an embodiment which is different from the first and second embodiments in that when the jam occurrence rate of the printing job is high, a print setting of the printing condition having the high occurrence rate of the jam is changed and then the printing is performed. For example, in this embodiment, a setting of the recording paper sheet W having the high occurrence rate of the jam is changed to a setting of the recording paper W having the low occurrence rate of the jam, or a setting of the tray T having the high occurrence rate of the jam is changed to a setting of the tray T having the low occurrence rate of the jam. An explanation will be appropriately omitted about the parts which are the same as or equivalent to those of the first embodiment.

Figure 10:
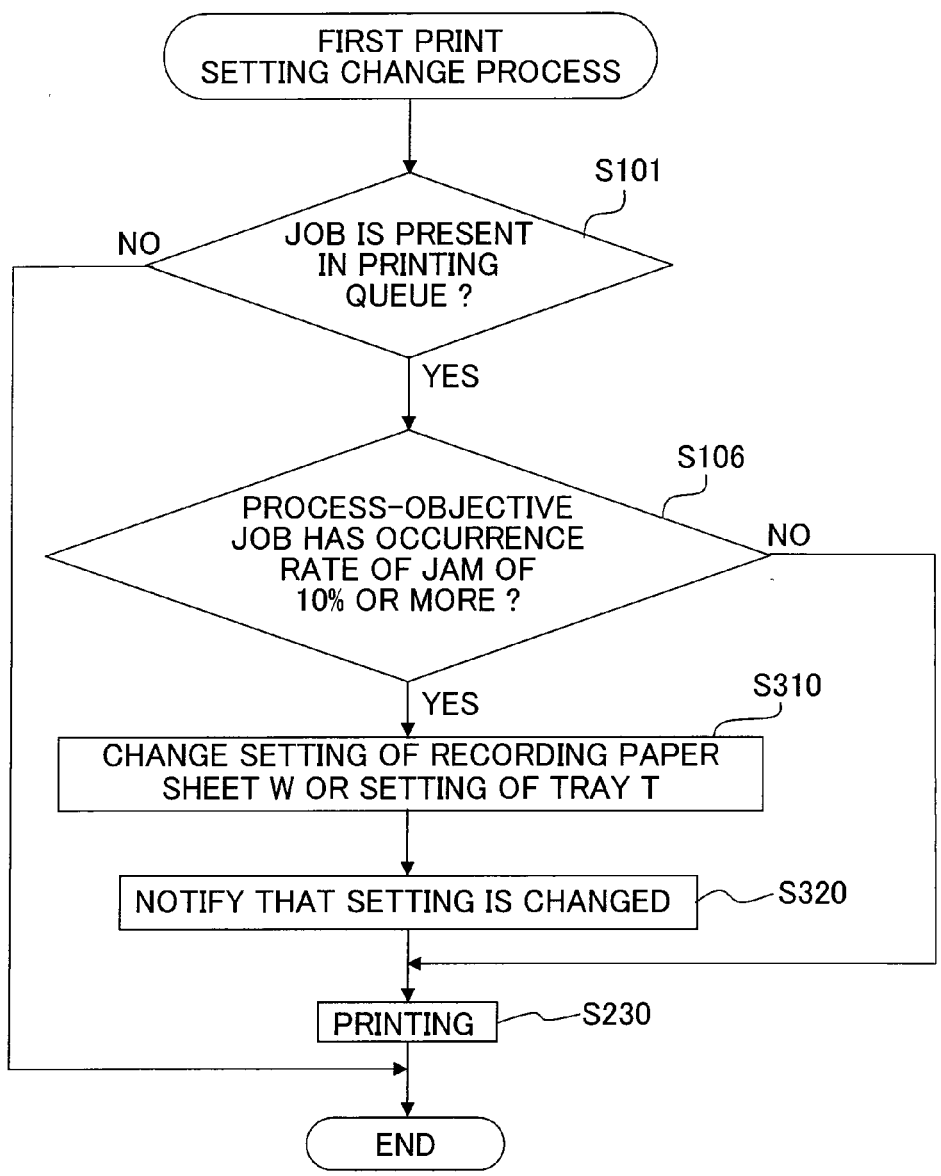
FIG. 10 is a flowchart showing the first print setting change process according to the third embodiment of the present teaching.

The first print setting change process, in which the print setting of the printing job having the high occurrence rate of the jam is changed, will be explained with reference to the flowchart of FIG. 10.

At first, the CPU 31 judges whether the printing job is present in the printing queue stored in the RAM 33 (S101). When the CPU 31 judges that the printing job is present in the printing queue (S101: YES), the CPU 31 subsequently judges whether the jam occurrence rate per one recording paper sheet in the printing condition of the process-objective job is 10% or more (S106).

In S106, when the CPU 31 judges that the jam occurrence rate per one recording paper sheet in the printing condition of the process-objective job is 10% or more (S106: YES), the setting of the recording paper sheet W or the setting of the tray T is changed to the setting in which the jam occurrence rate per one recording paper sheet in the printing condition of the process-objective job is not more than 10% (S310). Then, the CPU 31 notifies the user via the display section 36 that the setting of the recording paper sheet W or the setting of the tray T is changed to the setting in which the jam occurrence rate per one recording paper sheet in the printing condition of the process-objective job is not more than 10% (S320). Subsequently, the printing is performed by the printing section 37 based on the process-objective job (S230). Then, the first print setting change process is completed.

Figure 11:
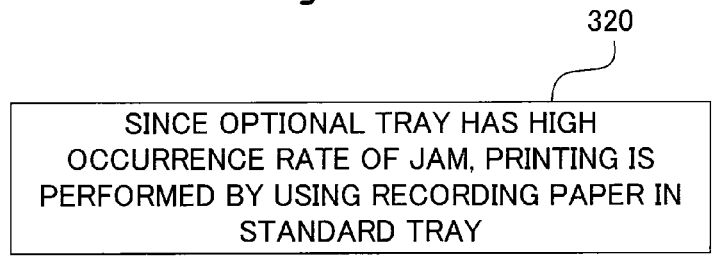
FIG. 11 is a diagram showing an example of still another message displayed on the display section.

For example, according to the jam information table 210 for each type of trays shown in FIG. 4, the jam occurrence rate in the optional tray T2 is 10%. Thus, the CPU 31 changes the setting of the tray T so that the standard tray T1 having the jam occurrence rate of 0.4% is used instead of the optional tray T2. Then, for example as shown in FIG. 11, the CPU 31 displays, on the display section 36, a message 320 having the content that "Since optional tray has high occurrence rate of jam, printing is performed by using recording paper in standard tray".

On the other hand, when the CPU 31 judges that the jam occurrence rate per one recording paper sheet in the printing condition of the process-objective job is less than 10% (S106: NO), the printing is performed by the printing section 37 based on the process-objective job (S230). Then, the first print setting change process is completed.

In S101, when the CPU 31 judges that the printing job is not present in the printing queue (S101: NO), the first print setting change process is completed.

Effect of Third Embodiment

The CPU 31 changes the printing condition of the process-objective job judged to have the high occurrence rate of the jam to the printing condition having the low occurrence rate of the jam (S310), and then the printing is performed by the printing section 37 based on the process-objective job after the change which has the low occurrence rate of the jam. Accordingly, it is possible to reduce the situation such that the printing is not performed based on the process-objective job having the high occurrence rate of the jam.

Further, when the CPU 31 judges that the jam occurrence rate per one recording paper sheet in the printing condition of the process-objective job is 10% or more (S106: YES), the CPU 31 changes the setting of the recording paper sheet W or the setting of the tray T to the setting in which the jam occurrence rate per one recording paper sheet in the printing condition of the process-objective job is not more than 10% (S310). Accordingly, the jam occurrence rate is decreased, and it is possible to suppress the occurrence of the jam without bothering the user.

Further, the CPU 31 notifies the user via the display section 36 that the setting of the recording paper sheet W or the setting of the tray T is changed to the setting in which the jam occurrence rate per one recording paper sheet in the printing condition of the process-objective job is not more than 10% (S320), thereby making it easy for the user to grasp that the type of the recording paper sheet or the type of the tray is changed, and thereby improving user-friendliness.

Fourth Embodiment

Next, the fourth embodiment of the present teaching will be explained. The fourth embodiment is a modified embodiment of the third embodiment. In the fourth embodiment, when the jam occurrence rate of the printing job is high, the user is encouraged to change the recording paper sheet W or the tray T specified by the user to the recording paper sheet W or the tray T having the low occurrence rate of the jam. When the recording paper sheet W or the tray T specified by the user is changed to the recording paper sheet W or the tray T having the low occurrence rate of the jam, the printing is performed.

The parts which are the same as or equivalent to those of the first to third embodiments, an explanation will be appropriately omitted.

Figure 12:
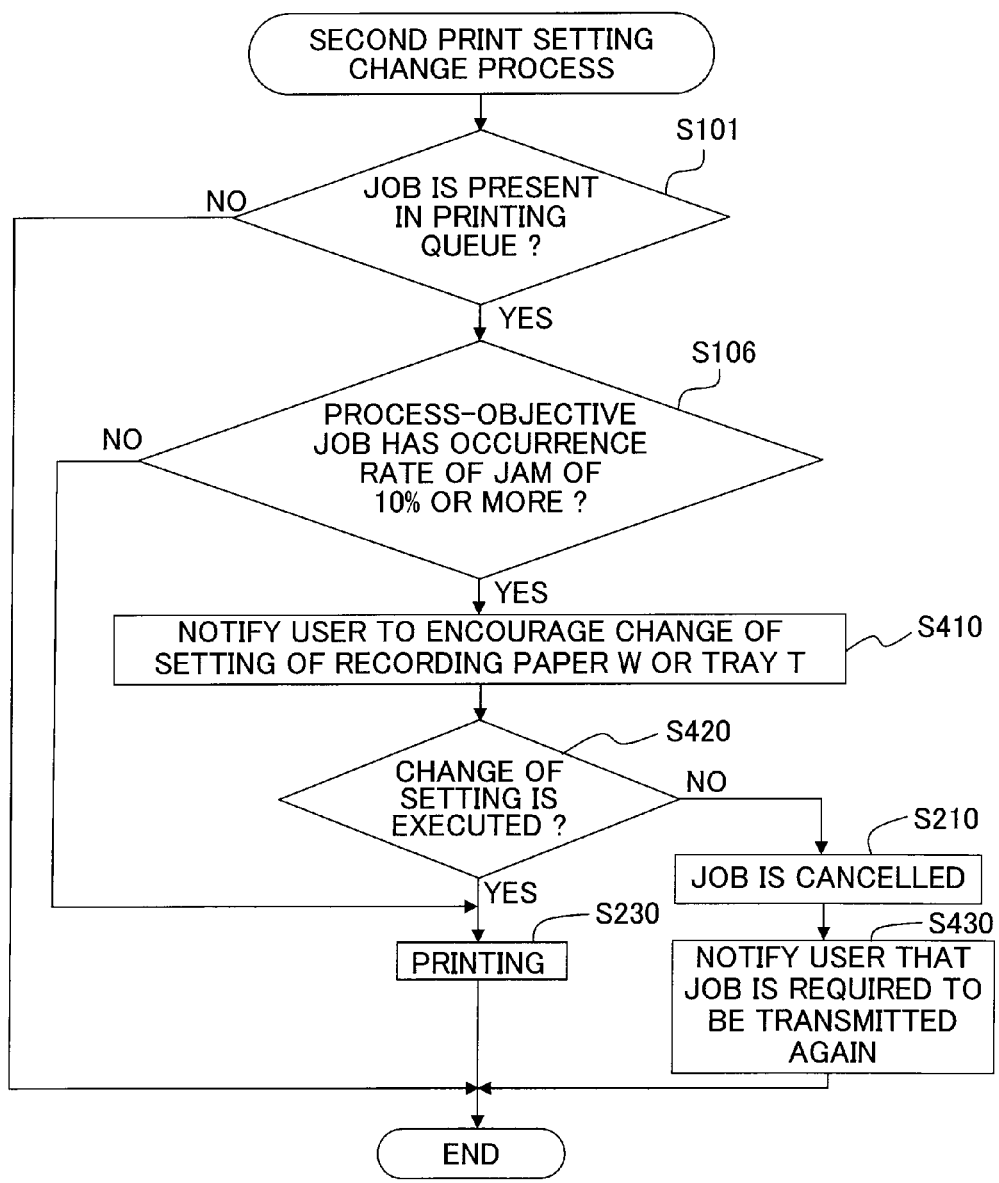
FIG. 12 is a flowchart showing the second print setting change process according to the fourth embodiment of the present teaching.

An explanation will be made about the second print setting change process, in which the print setting of the printing job having the high occurrence rate of the jam is changed, with reference to the flowchart of FIG. 12.

At first, the CPU 31 judges whether the printing job is present in the printing queue stored in the RAM 33 (S101). When the CPU 31 judges that the printing job is present in the printing queue (S101: YES), the CPU 31 subsequently judges whether the jam occurrence rate per one recording paper sheet in the printing condition of the process-objective job is 10% or more (S106).

Figure 13:
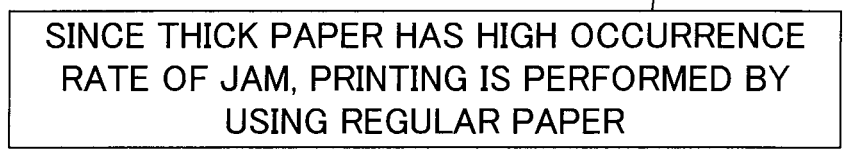
FIG. 13 is a diagram showing an example of yet another message displayed on the display section.

In S106, when the CPU 31 judges that the jam occurrence rate per one recording paper sheet in the printing condition of the process-objective job is 10% or more (S106: YES), for example as shown in FIG. 13, the CPU 31 notifies the user, via the display section 36 or by displaying on the display section 16 of the terminal apparatus 10, to change the setting of the recording paper sheet W or the setting of the tray T to the setting in which the jam occurrence rate per one recording paper sheet in the printing condition of the process-objective job is not more than 10% (S410). Then, the CPU 31 judges whether the setting of the recording paper sheet W or the setting of the tray T is changed (S420). When the CPU 31 judges that the setting of the recording paper sheet W or the setting of the tray T is changed (S420: YES), the printing is performed by the printing section 37 based on the process-objective job (S230). Then, the second print setting change process is completed.

Further, when the CPU 31 judges that the setting of the recording paper sheet W or the setting of the tray T is not changed (S420: NO), the process-objective job is deleted from the printing queue and is canceled (S210). Then, the CPU 31 notifies the user of the process-objective job deleted, by displaying on the display section 16 of the terminal apparatus 10, that the user is required to change the setting of the recording paper sheet W or the setting of the tray T and to retransmit the process-objective job after the change (S430). Then, the second print setting change process is completed.

On the other hand, when the CPU 31 judges that the jam occurrence rate per one recording paper sheet in the printing condition of the process-objective job is less than 10% (S106: NO), the printing is performed by the printing section 37 based on the process-objective job (S230). Then, the second print setting change process is completed.

In S101, when the CPU 31 judges that the printing job is not present in the printing queue (S101: NO), the second print setting change process is completed.

Effect of Fourth Embodiment

When the CPU 31 judges that the jam occurrence rate of the recording paper sheet is high, the user is encouraged to change the recording paper sheet W or the tray T specified by the user to the recording paper sheet W or the tray T having the low occurrence rate of the jam (S410). When the recording paper sheet W or the tray T specified by the user is changed to the recording paper sheet W or the tray T having the low occurrence rate of the jam (S420: YES), the printing is performed (S230). Accordingly, it is possible to reduce the situation such that the printing is not performed based on the process-objective job having the high occurrence rate of the jam.

Further, when the CPU 31 judges that the setting of the recording paper sheet W or the setting of the tray T is not changed (S420: NO), the process-objective job is canceled (S210). Thus, the printing based on the process-objective job having the high occurrence rate of the jam is prohibited. Accordingly, the situation, in which the printing by any other user is made to wait until the jam of the recording paper sheet W is canceled due to the occurrence of the jam of the recording paper sheet W, thereby causing any inconvenience to any other user, is less likely to be caused.

Further, when the CPU 31 judges that the jam occurrence rate per one recording paper sheet in the printing condition of the process-objective job is 10% or more (S106: YES), the CPU 31 encourages the user, in order to reduce the jam occurrence rate, to change the setting of the recording paper sheet W or the tray T specified by the user to the setting in which the jam occurrence rate per one recording paper sheet in the printing condition of the process-objective job is not more than 10%, by notifying via the display section 36 or by displaying on the display section 16 of the terminal apparatus 10 (S410). Accordingly, it is possible for the user to reduce any trouble for clearing the jam.

In the first to fourth embodiments, although each of the trays T provided on the bottom portion of the printer 30 is exemplified, the present teaching is not limited thereto. For example, a manual feeding tray (not shown) etc., for guiding the recording paper sheet from an insertion opening (not shown) formed to open in the front surface of the printer 30 to the resist rollers 49 may be provided. Further, it is allowable that the manual feeding tray is utilized when the recording paper sheet is manually fed.

In the first to fourth embodiments, it is judged based on the detecting signal from each of the sensors 40A, 40B whether the jam occurrence rate in each condition is high or low. However, the present teaching is not limited thereto. For example, whether the jam occurrence rate is high or low may be judged as follows. That is, for example, each of the conditions (a maximum number of paper sheets to be printed) and the jam occurrence rate are previously experimentally obtained, and the correspondence relation table thereof is stored in the hard disk drive 34. Then, the CPU 31 judges whether the jam occurrence rate is high or low by referring to the correspondence relation table. Further, the jam occurrence rate and at least any of temperature, humidity, the number of colors (color, black and white), a material of the recording paper sheet W (thick paper sheet, regular paper sheet, OHP), the type of the tray T, the cumulative number of recording paper sheets printed, the number of rotations of the roller(s), etc., are previously experimentally obtained, and the correspondence relation table thereof is stored in the hard disk drive 34. Then, the CPU 31 judges whether the jam occurrence rate is high or low by referring to the correspondence relation table.

In S107 of the first embodiment, the relative comparison between the jam occurrence rate per one recording paper sheet in the printing condition of the process-objective job and the jam occurrence rate per one recording paper sheet in the printing condition of the comparative job is made by the CPU 31. However, like S105 and S106, the process-objective job may be compared with the predetermined occurrence rate of the jam or absolute comparison may be performed. For example, S107 may be an embodiment in which the jam occurrence rate per one recording paper sheet in the printing condition of the comparative job is less than 10%. Further, S105 and S106 may be embodiments in which the relative comparison is made. S105 and S106 may be an embodiments in which when the CPU 31 judges that the jam occurrence rate per one recording paper sheet in the printing condition of the process-objective job is higher than the jam occurrence rate per one recording paper sheet in the printing condition of the comparative job, the process-objective job is moved to the end of the printing queue (S111).

In S105, S106, and S107 of the first embodiment, the jam occurrence rate per one recording paper sheet in the printing condition of the printing job is judged. However, the embodiment may be an embodiment in which the number of times of occurrence of the jam for each of the printing jobs is judged. For example, the number of times of occurrence of the jam for each of the printing jobs may be obtained based on the jam occurrence rate per one recording paper sheet in the printing condition of the printing job and the number of recording paper sheets printed for the printing job. For example, when it is assumed that the number of recording paper sheets printed is 100 sheets and that the jam occurrence rate per one recording sheet is 10% in a printing job 1, the number of times of occurrence of the jam is calculated as ten times. Further, when it is assumed that the number of recording paper sheets printed is 2000 sheets and that the jam occurrence rate per one recording sheet is 1% in a printing job 2, the number of times of occurrence of the jam is calculated as twenty times. Thus, it is allowable that the printing job 1 which is calculated to have a small number of times of occurrence of the jam is executed before the printing job 2 is executed.

The first embodiment is an embodiment in which the comparison is made between the first printing job in the printing queue and the second printing job in the printing queue. However, the first embodiment may be an embodiment in which the comparison is made between the process-objective job and any other printing job in the printing queue. For example, a pointer for comparison, which specifies the comparative job when the process-objective job is compared with any other printing job in the printing queue, is moved to the printing job which follows the process-objective job, and the printing job indicated by the pointer for comparison is determined as the comparative job (S104). Then, after the judgments in S107 to S110 are made for the comparative job, the pointer for comparison is moved to the printing job which follows the comparative job, and the judgments in S107 to S110 are made. This is performed for all of the printing jobs in the printing queue.

In the first embodiment, in a case that there are a plurality of printing jobs, each of which has the jam occurrence rate per one recording paper sheet of 20% or more, in the printing queue and that there is no printing job having the jam occurrence rate per one recording paper sheet of less than 20%, the printing may be performed in an descending order starting from one having the low occurrence rate of the jam per one recording paper sheet. Further, the printing may be performed when the printing instruction is carried out by the user through the operation section 36.

In the first to fourth embodiments, although the embodiments using the electro-photographic image forming apparatus are explained, the present teaching is also applicable to an ink jet image forming apparatus.

While some of the first to fourth embodiments have been described in detail with reference to the drawings, these are provided merely as examples. The present teaching can be carried out in any other embodiment in which various changes and modifications are made based on the inventor's knowledge.

What is claimed is:

1. A printing apparatus which performs printing on a recording paper sheet, comprising:
    a storage section which stores a plurality of printing jobs to be printed on the recording paper sheet;
    a transport section which transports the recording paper sheet;
    a printing section which performs the printing on the recording paper sheet transported by the transport section based on one of the printing jobs stored in the storage section;
    an occurrence rate judging section which calculates an occurrence rate of a jam of the recording paper sheet in the transport section during the printing based on each of the printing jobs stored in the storage section, and which compares a first occurrence rate which is the occurrence rate during the printing based on a first printing job stored first in the storage section with a second occurrence rate which is the occurrence rate during the printing based on a second printing job stored second in the storage section; and
    a control section which controls the printing section so that the printing based on the second printing job is performed before the printing based on the first printing job is performed, in a case that the occurrence rate judging section judges that the second occurrence rate is smaller than the first occurrence rate,
    wherein in a case that the occurrence rate judging section judges that the first occurrence rate during the printing based on the first printing job is smaller than a first value, the occurrence rate judging section compares the first occurrence rate with the second occurrence rate.

2. The printing apparatus according to claim 1, wherein after the printing based on the second printing job is performed by the printing section, in a case that only the first printing job is stored in the storage section, the control section controls the printing section to perform the printing based on the first printing job.

3. The printing apparatus according to claim 1, further comprising a job judging section which judges whether or not the second printing job satisfies a passing condition which is a condition in which the printing based on the second printing job is performed before the printing based on the first printing job is performed,
    wherein in the case that the occurrence rate judging section judges that the second occurrence rate is lower than the first occurrence rate and further that the job judging section judges that the second printing job satisfies the passing condition, the control section controls the printing section so that the printing based on the second printing job is performed before the printing based on the first printing job is performed.

4. The printing apparatus according to claim 3, wherein the passing condition is a condition in which a number of recording paper sheets to be printed for the second printing job is smaller than a number of recording paper sheets to be printed for the first printing job.

5. The printing apparatus according to claim 4, further comprising a reporting section which reports that the printing based on the second printing job is performed before the printing based on the first printing job is performed.

6. The printing apparatus according to claim 1, wherein in a case that the occurrence rate judging section judges that the first occurrence rate during the printing based on the first printing job is smaller than the first value and is not less than a second value which is smaller than the first value, the occurrence rate judging section compares the first occurrence rate with the second occurrence rate.

7. A printing apparatus which performs printing on a recording paper sheet, comprising:
    a storage section which stores a plurality of printing jobs to be printed on the recording paper sheet;
    a transport section which transports the recording paper sheet;

a printing section which performs the printing on the recording paper sheet transported by the transport section based on one of the printing jobs stored in the storage section;

a processor; and memory having machine readable instructions stored thereon which, when executed by the processor, cause the printing apparatus to:

calculate an occurrence rate of a jam of the recording paper sheet in the transport section during the printing based on each of the printing jobs stored in the storage section, compares a first occurrence rate which is the occurrence rate during the printing based on a first printing job stored first in the storage section with a second occurrence rate which is the occurrence rate during the printing based on a second printing job stored second in the storage section;

control the printing section so that the printing based on the second printing job is performed before the printing based on the first printing job is performed, in a case that the second occurrence rate is smaller than the first occurrence rate; and in a case that the first occurrence rate during the printing based on the first printing job is smaller than a first value, comparing the first occurrence rate with the second occurrence rate.

8. The printing apparatus according to claim 7, wherein after the printing based on the second printing job is performed by the printing section, in a case that only the first printing job is stored in the storage section, the instructions, when executed by the processor, causes the printing apparatus to control the printing section to perform the printing based on the first printing job.

9. The printing apparatus according to claim 7, wherein the instructions, when executed by the processor, causing the printing apparatus to:

judge whether or not the second printing job satisfies a passing condition which is a condition in which the printing based on the second printing job is performed before the printing based on the first printing job is performed, wherein in the case that the second occurrence rate is lower than the first occurrence rate and that the second printing job has been judged as satisfying the passing condition, the instructions, when executed by the processor, causing the printing apparatus to control the printing section so that the printing based on the second printing job is performed before the printing based on the first printing job is performed.

10. The printing apparatus according to claim 9, wherein the passing condition is a condition in which a number of recording paper sheets to be printed for the second printing job is smaller than a number of recording paper sheets to be printed for the first printing job.

11. The printing apparatus according to claim 10, further comprising a reporting section which reports that the printing based on the second printing job is performed before the printing based on the first printing job is performed.

12. The printing apparatus according to claim 7, wherein in a case that the first occurrence rate during the printing based on the first printing job is smaller than the first value and is not less than a second value which is smaller than the first value, the instructions, when executed by the processor, causing the printing apparatus to compare the first occurrence rate with the second occurrence rate.

* * * * *